INVENTOR
F. MARTINDELL

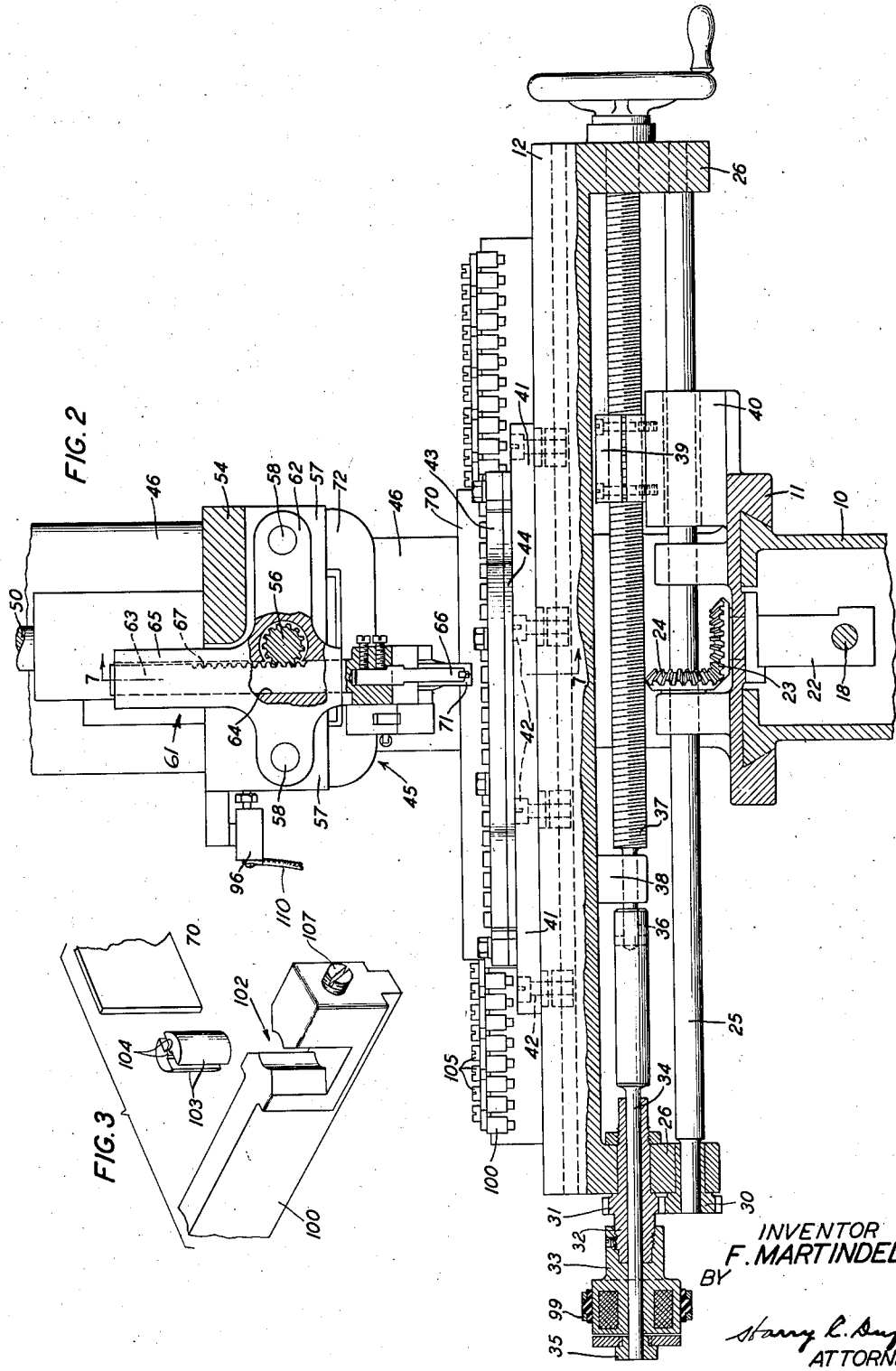

Aug. 15, 1944.     F. MARTINDELL     2,355,812
APPARATUS FOR SHAPING ARTICLES
Filed July 23, 1943     5 Sheets-Sheet 4

INVENTOR
F. MARTINDELL
BY
*Harry R. Drift*
ATTORNEY

Aug. 15, 1944.  F. MARTINDELL  2,355,812
APPARATUS FOR SHAPING ARTICLES
Filed July 23, 1943   5 Sheets-Sheet 5

INVENTOR
F. MARTINDELL
BY
*Harry R. Duff*
ATTORNEY

Patented Aug. 15, 1944

2,355,812

UNITED STATES PATENT OFFICE 2,355,812

APPARATUS FOR SHAPING ARTICLES

Frank Martindell, Western Springs, Ill., assignor to Western Electric Company, Incorporated, New York, N. Y., a corporation of New York Application July 23, 1943, Serial No. 495,911

10 Claims. (Cl. 164—47)

This invention relates to apparatus for shaping an article, and more particularly to apparatus for profiling a master cam.

In some types of mechanical operations, and particularly in shaping operations, it may be desirable to control the operation by a master cam. Where a limited number of cams of a particular size are to be made, and it is desired to have all cams of exactly the same size and contour, some difficulties may be experienced in economically shaping the cams to precisely the same dimensions.

An object of the present invention is to provide an efficient and effective apparatus for profiling a master cam.

In accordance with one embodiment of this invention, an apparatus may be provided for profiling a master cam, the apparatus employing a longitudinally movable work support having an adjustable guide associated therewith and a work head transversely movable with respect to the work support. A knife edged member mounted on the work head engages the adjustable guide and controls the transverse movement of the work head as a cutting tool mounted thereon is reciprocated, the cutting tool being positively driven in both directions. During the intermittent longitudinal movement of the work support and the guide, the pressure engaging the knife edge member with the guide is relieved.

Other objects and advantages of the present invention will be more apparent from the following detailed description taken in conjunction with the accompanying drawings, wherein Fig. 1 is a side elevation of a profiling apparatus constructed in accordance with this invention;

Fig. 2 is a fragmentary front elevation, partly in section, along the line 2—2 of Fig. 1;

Fig. 3 is a detailed perspective view of a portion of the adjustable guide support;

Figure 1:
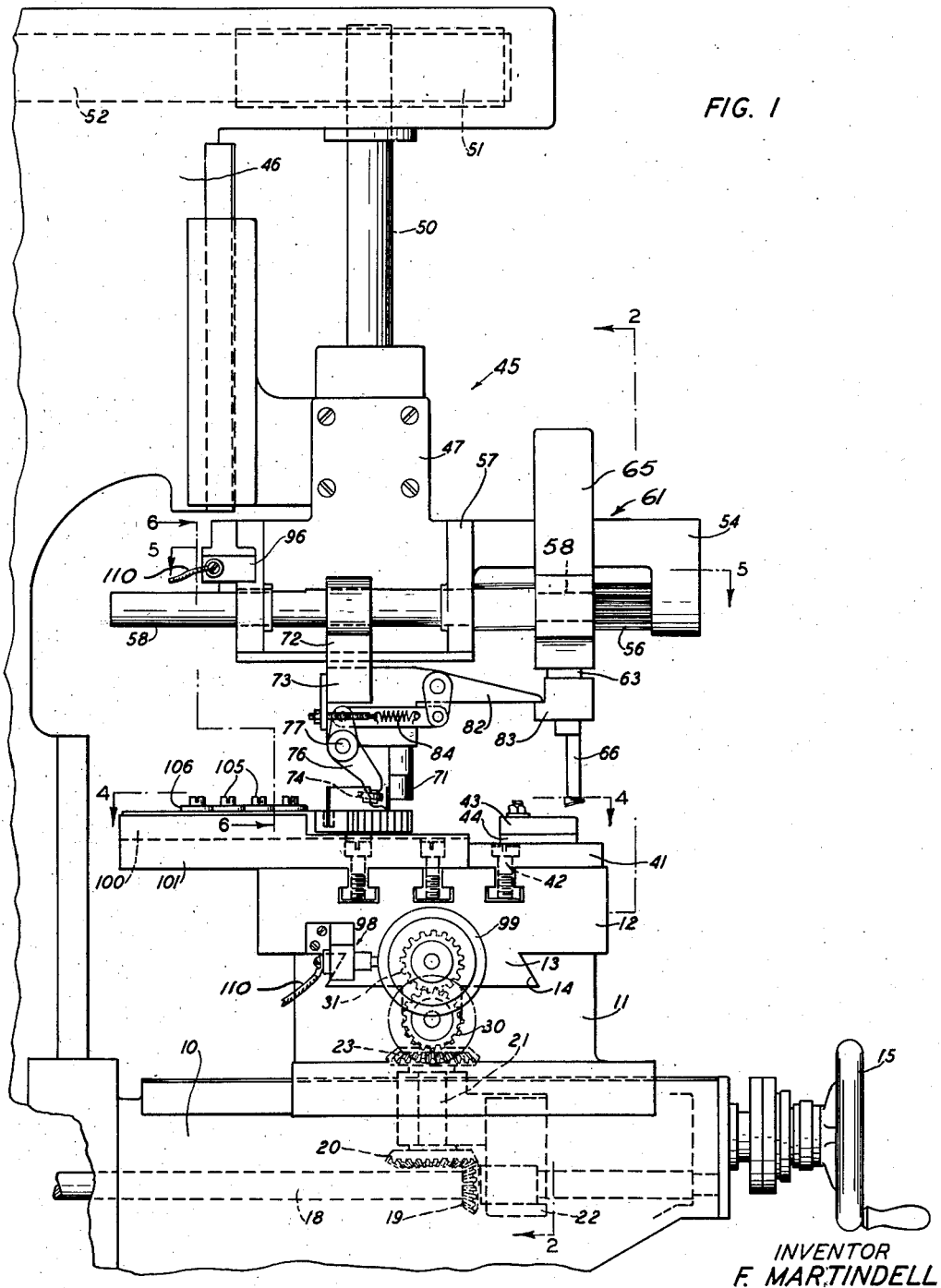

Referring now to the drawings, and particularly to Figs. 1 and 2, a master cam profiling apparatus is there illustrated comprising a table 10 on which is slidably mounted a transversely movable carriage bed 11. A longitudinally movable, elongated base member 12 is slidably mounted on the upper portion of the bed 11, a dovetail portion 13 fitting closely into a slot 14 formed in the bed 11. A crank 15 operates a mechanism, not shown, by which the bed 11 and base member 12, supported thereon, are moved transversely with respect to the table 10. The mechanism for moving the base member 12 longitudinally with respect to the bed 11 comprises a splined power shaft 18 which is journalled in the lower portion of the table 10 and is provided with a bevel gear 19 keyed thereto and axially movable therealong. This gear drives a second gear 20 which is positioned at substantially right angles thereto and mounted on the lower end of a short, vertically positioned shaft 21, journalled in the underside of the bed 11. These two gears are held in engagement by a block 22 which is mounted on the underside of the transversely movable bed 11 and engages the hub of the bevel gear 19 which is rotatably journalled therein. As the bed is moved transversely with respect to the table 10, the gear 19 is also moved along the shaft 18 and, thus, held in engagement with the gear 20. A second bevel gear 23 is fixed to the upper end of the short shaft 21 and engages a bevel gear 24 which is keyed to and mounted on a splined shaft 25 extending the length of the bed 11, the shaft 25 being movable axially with respect to the gear 24 as the base 12 is moved longitudinally. The ends of the shaft 25 are journalled in downwardly extending end plates 26, integrally formed at the ends of the base member 12 and a spur gear 30 is keyed to the left end of the shaft. This gear engages a gear 31 integrally formed with a sleeve 32 which is connected to an electromagnetic clutch member 33, the sleeve being rotatably journalled in the left side of the plate 26 of the base member 12 and having a rotatable shaft 34 extending therethrough. A second clutch member 35 of the electromagnetic clutch is fixed to the left end of the shaft 34 and is engageable in driving relation with the clutch member 33 when the electromagnetic clutch is energized and actuated, to cause the shaft 34 to be rotated. The mechanism for energizing the electromagnetic clutch will be described hereinafter.

A reduced portion 36 of a threaded shaft 37 extends through a bearing block 38 which is mounted on the underside of the base 12, and this portion is drivably connected to the right end of the driven shaft 34, the right end of the shaft 37 being journalled in the right side plate 26. A split block 39, mounted on a projecting member 40 of the bed 11, has an aperture extending therethrough which is threaded to engage the threaded shaft 37. Consequently, when the electromagnetic clutch is actuated and the shaft 37 rotated, the apparatus base 12 is moved longitudinally.

An article supporting plate 41 is fixed to the upper side of the base 12, being held in place by a number of bolts 42, and an article 43 to be profiled is bolted thereto, being separated therefrom by a strip 44 of an easily cut material such as a phenolic condensation product. It will be apparent that unless a separating strip of easily cut material were provided, some difficulty might be encountered in obtaining a cleanly cut lower edge on the article being profiled. In the present case, the article, as shown, has been roughly profiled prior to being placed on the apparatus, since this apparatus is primarily designed to be used in a finishing operation wherein the article is profiled to highly precise dimensions.

Figure 7:
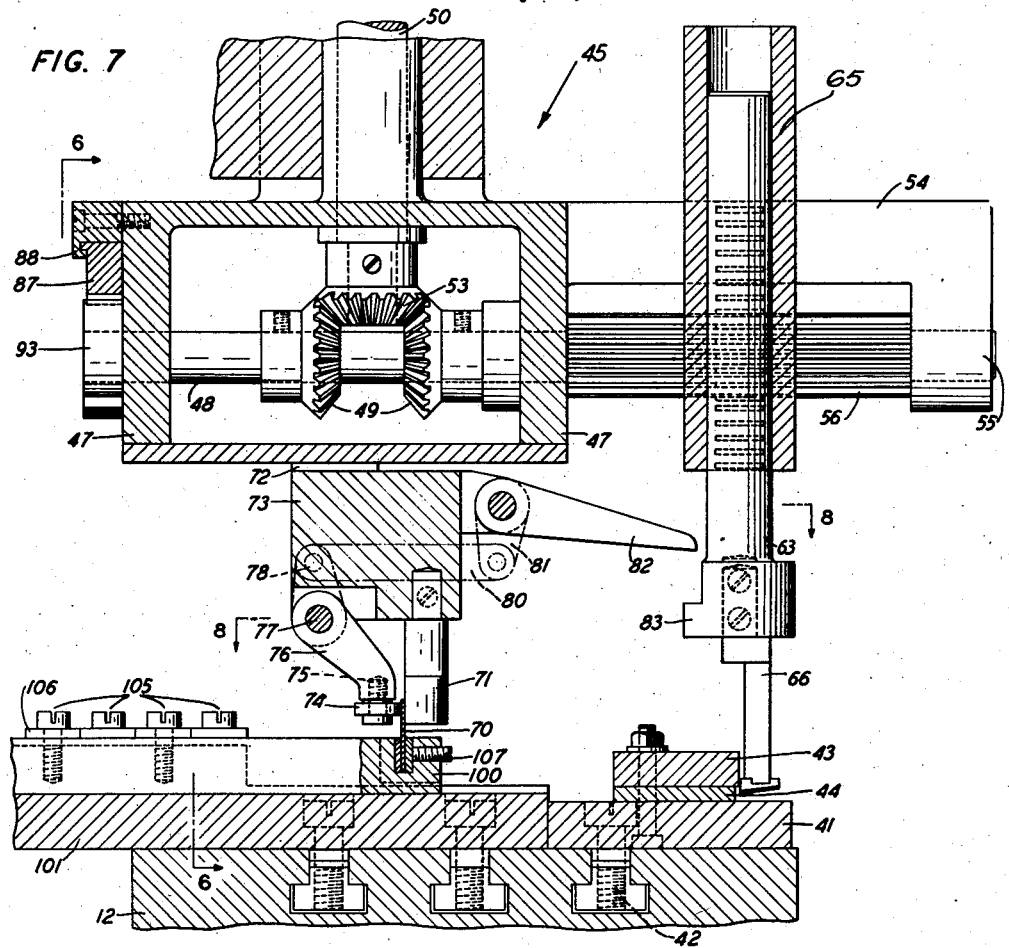
Fig. 7 is a vertical, sectional view along the line 7—7 of Fig. 5.

A work head, designated generally as 45 and shown in Figs. 1, 2 and 7, is positioned above the article 43, being supported on a vertically disposed standard 46 of conventional design. This work head comprises a gear housing 47 through which extends a horizontally disposed shaft 48, shown in Figs. 5 and 7. A pair of bevel gears 49 are mounted on and keyed to the shaft 48 while a vertically disposed power shaft 50 extends through the upper side of the housing 47 and is provided with a pulley 51 at its upper end around which passes a driving belt 52, which may be driven by suitable means, not shown.

Figure 5:
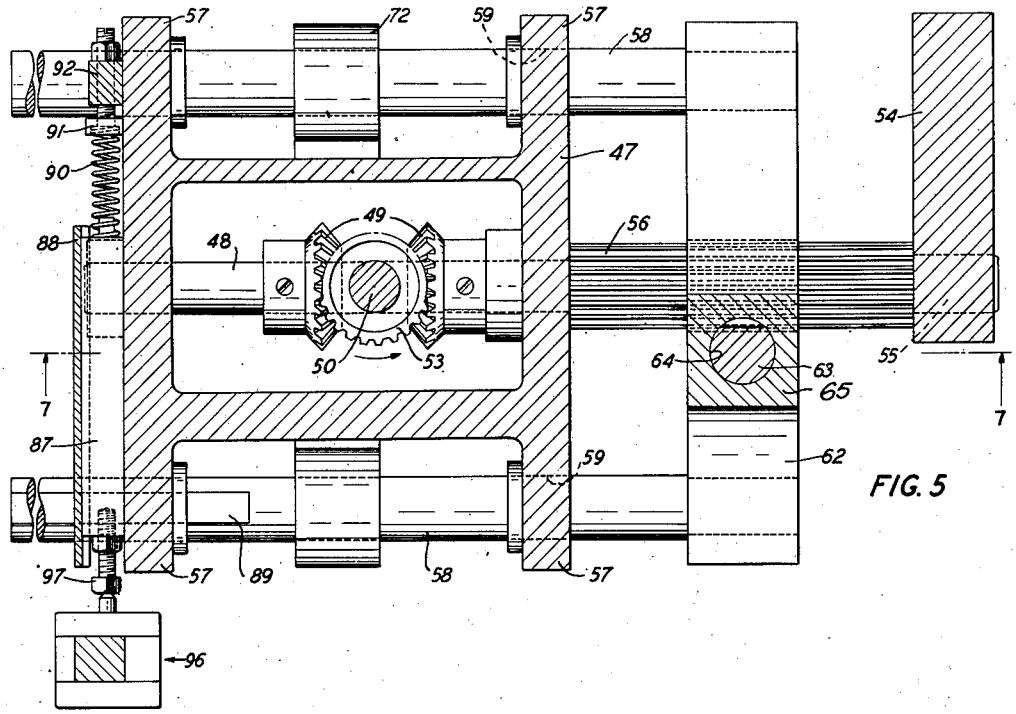
Fig. 5 is an enlarged, horizontal, sectional view along the line 5—5 of Fig. 1.

In order to positively reciprocate the cutting tool, which will be described hereinafter, a bevel gear 53, having the larger portion of its teeth removed, as shown in Fig. 5, is keyed to the lower end of the shaft 50 and engages, depending on its position, one or the other of the bevel gears 49. Sufficient teeth are removed from the bevel gear 53 so that, as the first tooth engages one of the bevel gears 49, the last tooth is disengaged from the other bevel gear 49. It will be apparent, therefore, that the shaft 48 is first rotated in one direction and then rotated in the reverse direction while the shaft 50 rotates constantly in the same direction.

An L-shaped bracket 54 is fixed to the right hand side of the housing 47, as shown in Fig. 7, the smaller portion extending downwardly, as shown, to provide a support for a hub 55 of an elongated pinion gear 56 which is rotatably journalled therein. The left hub of the elongated gear 56 is journalled in a side of the housing 47 and is drivably connected to the shaft 48.

Two opposite sides of the housing 47 are provided with integrally formed, extended portions 57, as shown in Fig. 5, to provide a support for a pair of rods 58 which extend through suitable apertures 59 formed therein, the rods being axially movable therethrough. A cutter housing 61 is supported by the rods 58, the right ends of the rods extending into and being fixed to a cross member 62 which forms a part of the housing 61, as shown in Fig. 5. A vertically positioned bar 63, which serves as a rack, is slidably mounted in an aperture 64 formed in the housing 61, an upper portion 65 integrally formed with the housing 61 serving as a guide for the rack 63 which is vertically reciprocable therein. This rack serves as a support for a cutting tool 66 which is fixed to the lower end thereof and is engageable with the work 43 positioned on the supporting plate 41 when the supporting rack 63 is reciprocated.

Reciprocation of the rack 63 is accomplished by the rotation of the elongated pinion gear 56, the pinion gear engaging teeth 67 formed in the rack 63, as shown in Fig. 2. It will be apparent that as one bevel gear 49 is engaged by the mutilated bevel gear 53, the pinion gear 56 will be rotated in one direction and the cutting tool will be moved downwardly and into engagement with the edge of the edge of the article being profiled. Then, as the other bevel gear 49 is engaged by the gear 53, the gear 56 will be rotated in the reverse direction and the cutting tool moved upwardly and out of engagement with the article 43.

Figure 4:
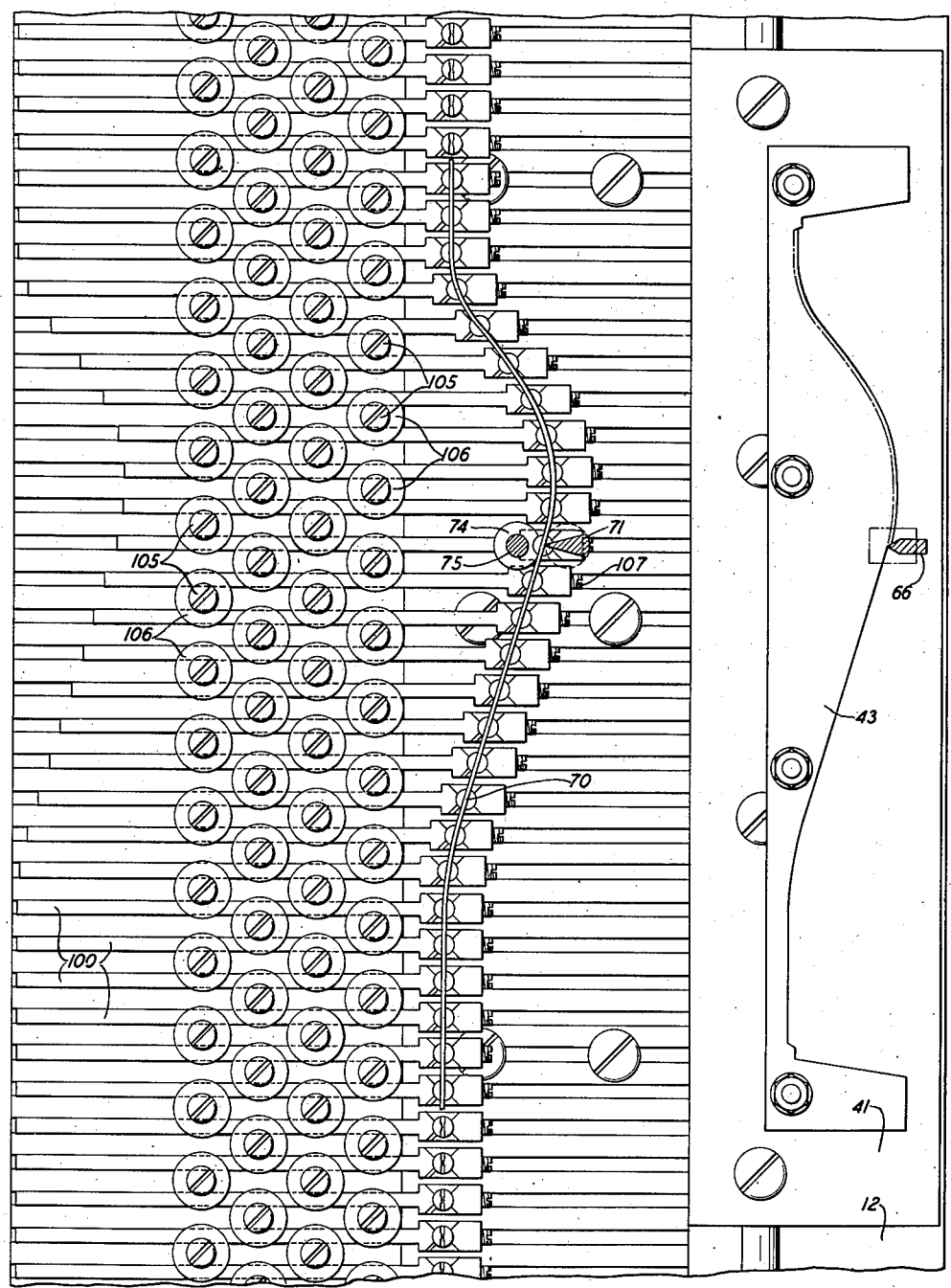
Fig. 4 is an enlarged plan view of a guide holder, certain parts being shown in section, taken along the line 4—4 of Fig. 1.
Figure 8:
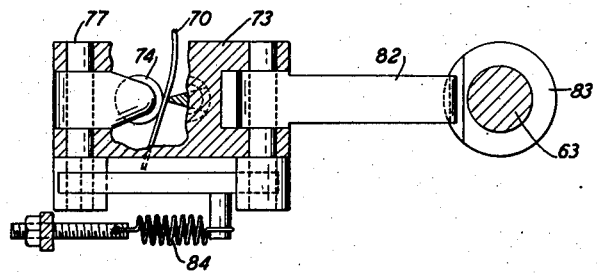
Fig. 8 is a horizontal, sectional view along the line 8—8 of Fig. 7.

The position of reciprocation of the cutting tool is controlled by a strip 70, shown in Figs. 4, 7 and 8, which is engaged by a knife-edge follower 71 rigidly associated with the cutting tool housing. The cutting tool carriage, that is, the cross member 62 and upper portion 65, is laterally movable with respect to the fixed gear housing 47, the rods 58 which support the cross member 62 being slidably journalled in the extended portions 57 of the gear housing. A yoke 72 is mounted on the rods 58, as shown in Fig. 5, and the knife edge follower is mounted on an extension 73 fixed to the lower side of the yoke 72. During longitudinal advance of the strip 70, which is adjustably mounted on the longitudinally movable base 12, as will be hereinafter explained, a spring pressed roller 74, which normally bears against the left side of the strip 70 and holds the knife edge follower 71 in engagement therewith, is moved out of engagement with the strip 70, thus relieving the contact pressure of the knife edge follower 71 and, consequently, preventing scraping of the strip 70 which might tend to change the contour thereof, even such slight changes as might be occasioned by such scraping being sufficient to impair the accuracy with which this apparatus is designed to operate.

As will be seen in Fig. 7, the roller 74, which is rotatably mounted on a stud shaft 75, fixed to the lower end of a pivotally mounted bracket arm 76, is moved out of engagement with the strip 70 by the pivoting of the arm 76 which is mounted on a pivot 77 which also supports a second arm 78 connected thereto. A link arm 80 pivotally connects this short arm 78 to a short arm 81 of a bell crank lever 82 connected thereto. The lever 82 is pivoted in turn by a lug 83 fixed to the lower end of the reciprocable toothed rack 63 which supports the cutting tool 66. Thus, as the cutting tool 66 is raised, the lug 83 is also raised and engages and pivots the lever 82 upwards. This moves the roller 74 out of engagement with the strip 70. A spring 84 connected to the link arm 80 returns the roller into engagement with the strip 70 when the lug 83 moves downward and out of engagement with the lever 82.

Figure 6:
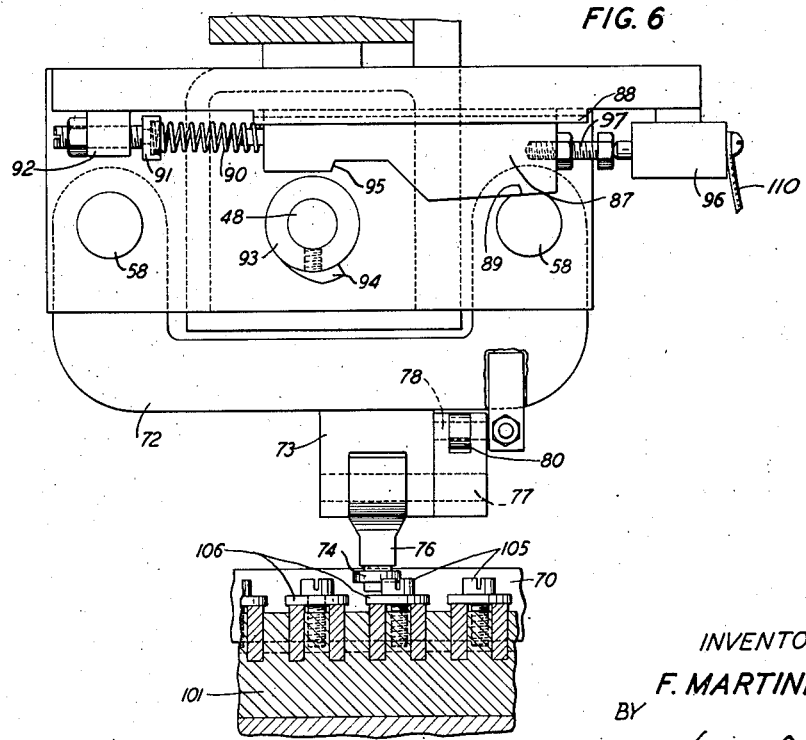
Fig. 6 is an enlarged, vertical, sectional view along the line 6—6 of Fig. 1.

As stated hereinbefore, the yoke 72 which supports the guide mechanism is mounted on the rods 58 which are slidably positioned in apertures 59 formed in the extended portions 57 of the sides of the gear housing. In order to lock the rods 58 which support the cutter housing 61, to prevent lateral movement thereof during the reciprocation of the cutting tool 66, a bar 87 having an inclined lower surface is slidably mounted on the rear side of the housing 47, being held in position by a retaining plate 88 fixed to the housing. The inclined lower surface of the bar 87 is engageable with a flattened portion 89 of one of the rods 58, as shown in Figs. 5 and 6, being moved into engagement therewith by a helically coiled spring 90 positioned at the rear of the bar 87 and engaging an adjustable member 91 threadedly mounted on a lug 92 fixed to the rear side of the housing 47. A rotatable disc 93 keyed to the shaft 48, which is rotated by the bevel gears 49, is provided with a shouldered portion 94 which is engageable with a shoulder 95 integrally formed with the lower rear side of the bar 87, as shown in Fig. 6. Thus, as the shaft 48 is rotated in counterclockwise direction, as viewed in Fig. 6, the shouldered portion 94 of the disc 93 will engage the shoulder 95 of the bar 87 and move it against the pressure of the spring 90 and out of engagement with the flattened portion 89 of the rod 58. During the time that the bar 87 is out of engagement with the rod 58, a microswitch 96, mounted on the rear wall of the housing 47, as shown in Fig. 6, is actuated by a threaded member 97 adjustably mounted on the forward portion of the bar 87 to close a circuit to a brush 98 which contacts a slip ring 99 associated with the electromagnetic clutch. A conductor 110, shown fragmentarily, connects the micro-switch 96 to the brush 98. Energizing the electromagnetic clutch causes the threaded shaft 37 to be rotated to advance the base 12 and work relatively to the cutting tool.

As stated hereinbefore, the position of reciprocation of the cutting tool 66 is controlled by the contour of the guide strip 70. As shown in Figs. 3 and 4, the strip is supported on a number of parallel spaced adjustable bars 100 which are slidably mounted on a plate 101 mounted on the base 12 of the apparatus. Each bar is provided with a recessed portion 102 which extends transversely thereacross, as shown in Fig. 3. The two opposite walls of the recess are arcuately shaped to receive a pair of semi-cylindrical members 103. The inner sides, that is, the flat sides, of the semi-cylindrical members 103, are provided with a raised portion 104 which engages the strip, providing thereby a smaller contact and consequently greater flexibility. The bars 100 are held in place on the plate 101 by a number of bolts 105 which are threaded into the plate 101 and which are provided with washers 106, the bolts being so positioned between the bars 100 that each washer engages two adjacent bars. The strip 70 may thus be bent to have a wide variety of contours.

In using this guide mechanism, the strip 70 is assembled between the semi-cylindrical members 103 which are positioned in the recesses 102 of the bars 100 and the bars moved with respect to each other to obtain the desired contour in the strip. When the strip has been bent as required, screws 107 which clamp the member 103 in place are tightened and the bars 100 are locked in place by tightening the bolts 105.

While a description of the operation of the individual parts has been given as each part was described, it is believed that a summary of the operation of the several parts of this apparatus may facilitate an understanding of the working thereof.

After the strip 70 has been adjusted to present the desired contour to the follower 71, and the article 43 bolted to the supporting plate 41, the position of the carriage is adjusted by rotating the crank 15 so that the cutting tool 66 will cut to the desired depth. A vertical adjustment of the work head 45 may be provided but is not shown. The power supply for the belt 52 is then operated to cause the shaft 50 to rotate. This, in turn, causes the shaft 48 to be rotated either clockwise or counterclockwise, depending on which of the bevel gears is first engaged. If the left bevel gear, as seen in Fig. 7, is first engaged, which is the normal starting position, then as the gear is rotated, the cutting tool 66 will be moved downward and into engagement with the edge of the article 43. As the cutting tool 66 is moved downward and before the cutting tool has engaged the article, the lug 83 moves out of engagement with the lever arm 82 thus permitting the spring pressed roller 74 to engage the rear side of the strip 70, which action in turn causes the knife edge follower 71 to engage the opposite side of the strip, thereby moving the rods 58, which support the cutting tool housing, to obtain the desired position of reciprocation of the cutting tool. At the same time, the bar 87 is engaged with the flattened portion 89 of one of the rods 58, thus locking the rod 58 and preventing any movement of the cutting tool support during the actual cutting operation.

As the shaft 50 continues to rotate, the gear 53, keyed thereto, disengages the left bevel gear 49 and engages the right bevel gear, as viewed in Fig. 7, causing the shaft 48 to be rotated in the reverse direction. The cutting tool then moves upward and out of engagement with the article and the lug 83 engages the lever 82 and pivots it upwards and thereby moves the roller 74 out of engagement of the strip 70, thus relieving the contact pressure of the knife edge follower 71. At the same time, the bar 87 is moved out of engagement with the rod 58 by the shouldered portion 94 of the disc 93 which engages the shoulder 95 of the bar 87, thus preparing the cutting tool support for such lateral movement as may be required to obtain the desired position of reciprocation in the next cycle of operation. After the roller 74 has been disengaged from the strip 70, the microswitch 96 is actuated by the threaded member 97 to close the circuit to the electromagnetic switch which controls the longitudinal movement of the apparatus base and the guide strip and article 43 are then advanced a predetermined amount.

What is claimed is:

1. An article profiling apparatus comprising a support for work to be profiled, a cutting tool, a movable support for said cutting tool, said article support being movable longitudinally with respect to said cutting tool support to advance the article with respect to said cutting tool, guide means associated with said article support, means associated with said cutting tool support for engaging said guide means to control the movement of said support, means for clamping said guide engaging means against said guide means, and means for positively engaging and disengaging said cutting tool with said article.

2. An article profiling apparatus comprising a support for an article, a cutting tool, a support for said cutting tool, means for moving said article support longitudinally with respect to said cutting tool to advance said article, means associated with said cutting tool support for actuating said article support moving means, guide means associated with said article support, means engageable with said guide means for controlling the plane of reciprocation of said cutting tool, means for clamping said guide engaging means against said guide means, and means actuated by the reciprocation of said cutting tool for relieving the clamping pressure.

3. In an apparatus for profiling an article, a support for an article, a cutting tool reciprocable with respect to said support, a driving shaft for reciprocating said cutting tool, a pair of gears on said shaft, and driven means for engaging first one gear and then the other gear to alternately rotate said driving shaft in opposite directions to reciprocate said cutting tool.

4. In an apparatus for profiling an article, a movable work bed for supporting an article, a reciprocable cutting tool for cutting the article, a flexible strip for predetermining the plane of reciprocation of said cutting tool, means for supporting said strip, means associated with said cutting tool for engaging said strip to predetermine the plane of reciprocation of said cutting tool, and means actuated by said reciprocable cutting tool for disengaging said strip engaging means during the advance of said work bed.

5. In an article shaping apparatus, means for supporting an article, reciprocable means for shaping said article, means for intermittently advancing said article supporting means comprising a constantly driven shaft, a clutch associated therewith, a threaded shaft drivable through said clutch and advancing said article supporting means, and means operated in response to the reciprocation of said shaping means for actuating said clutch.

6. In an article profiling apparatus, means for cutting an article, means for guiding said cutting means comprising an adjustable strip, a plurality of relatively adjustable parallel bars having recesses formed therein, and semi-cylindrical clamping members receivable in said recesses, said strip being positioned between said clamping members and engaged thereby.

7. In an article profiling apparatus, a support for an article, a cutting tool reciprocable and transversely movable with respect thereto, a rack associated with said cutting tool, an elongated pinion gear engaging said rack, means for oscillating said pinion gear to reciprocate said cutting tool, and means for moving said cutting tool transversely, whereby said rack is caused to slide along said pinion.

8. In an article shaping apparatus, a reciprocable cutting tool, a guide strip for guiding said cutting tool, a knife edge follower associated with said cutting tool for engaging one side of said strip, a roller for engaging the opposite side of said strip to hold said follower in contact therewith, and means operable in response to the reciprocation of said cutting tool for releasing said follower from said strip.

9. In an article profiling apparatus, a support for an article, a cutting tool transversely movable and vertically reciprocable with respect thereto, means for controlling the plane of reciprocation of said cutting tool, and means for preventing transverse movement of said cutting tool during a portion of the reciprocation thereof.

10. In an apparatus for profiling an article, an article support, a cutting tool reciprocable with respect to said support, a driving shaft for reciprocating said cutting tool, a pair of gears on said shaft, and a mutilated gear for engaging first one gear and then the other gear on said shaft to alternately rotate said driving shaft in opposite directions to reciprocate said cutting tool.

FRANK MARTINDELL.